United States Patent [19]

Hirota et al.

[11] 4,346,774

[45] Aug. 31, 1982

[54] DOPPLER RADAR MOUNTING STRUCTURE FOR MOTOR VEHICLES

[75] Inventors: Yukitsugu Hirota, Yokohama; Akira Endo, Katsuta; Katsuhiro Kimura, Katsuta; Hiroshi Morozumi, Katsuta; Kenji Sekine, Tokyo, all of Japan

[73] Assignees: Hitachi, Ltd.; Nissan Motor Co., Ltd., both of Tokyo, Japan

[21] Appl. No.: 78,825

[22] Filed: Sep. 25, 1979

[30] Foreign Application Priority Data

Sep. 26, 1978 [JP] Japan .................. 53-118969
Dec. 13, 1978 [JP] Japan .................. 53-153070

[51] Int. Cl.³ .......................................... B60T 8/10
[52] U.S. Cl. ...................... 180/167; 180/197; 343/7 ED; 343/771
[58] Field of Search ............... 180/167, 168, 169, 197, 180/282, 296, 313, 309, 89.2; 296/37.1, 204; 362/81; 343/7 VM, 7 ED, 7.4, 713, 746, 762, 771

[56] References Cited

U.S. PATENT DOCUMENTS

| | | | |
|---|---|---|---|
| 1,738,092 | 12/1929 | Bach | 362/81 |
| 2,190,224 | 2/1940 | Vincent | 296/204 |
| 2,390,557 | 12/1945 | Scaife | 180/309 |
| 2,730,717 | 1/1956 | Katchky et al. | 343/771 |
| 2,883,232 | 4/1959 | Olley et al. | 296/204 |
| 3,146,449 | 8/1964 | Serge et al. | 343/771 |
| 3,214,761 | 10/1965 | Schlaud | 343/771 |
| 3,259,898 | 7/1966 | Tober | 343/771 |
| 3,794,997 | 2/1974 | Iwatsuki et al. | 343/7 VM |
| 3,889,259 | 6/1975 | Fukumori | 343/7 VM |
| 3,918,058 | 11/1975 | Noyori | 343/7 VM |
| 4,107,680 | 8/1978 | Kaplan | 343/7 VM |

FOREIGN PATENT DOCUMENTS

| | | | |
|---|---|---|---|
| 2700715 | 7/1978 | Fed. Rep. of Germany | 180/309 |
| 48-6992 | 5/1973 | Japan | 343/7 VM |
| 53-22223 | 7/1978 | Japan | 343/7 VM |
| 53-13752 | 10/1978 | Japan | 343/7 VM |
| 53-38395 | 10/1978 | Japan | 343/7 VM |
| 1487701 | 10/1977 | United Kingdom | 180/167 |

OTHER PUBLICATIONS

"Electronic Skid Control Module", Nissan Motor Co. Ltd., Dec. 1977.
"Doppler Radar Speed Sensor for Anti-Skid Control System", SAE/IEEE Convergence 1978.

Primary Examiner—David M. Mitchell
Attorney, Agent, or Firm—Craig and Antonelli

[57] ABSTRACT

A Doppler radar speed sensor including an antenna section and a sensor section is mounted on the underside of the automobile undercarriage. A recess for accommodating the Doppler radar speed sensor is formed in part of the underside of the automobile undercarriage within a rectangle surrounded by the wheels, and the Doppler radar speed sensor is mounted fully within the recess. This structure prevents the sensor from being damaged in an unfavorable environment or external vehicle devices from being interfered with by the leakage of the unrequired radar wave. For size reduction, the Doppler radar speed sensor is provided with a metal casing integrated with a slotted waveguide antenna. The slot array of the antenna is formed in one side of the metal casing, so that the metal casing, makes up part of the slot array antenna.

11 Claims, 19 Drawing Figures

DOPPLER RADAR MOUNTING STRUCTURE FOR MOTOR VEHICLES

The present invention relates to a mounting structure of the Doppler radar of vehicles such as automobiles and the structure of the Doppler radar, or more in particular to a mounting structure of a Doppler radar speed sensor suitably used for the undercarriage of the automobile which is likely to contact the road surface and a microwave Doppler radar antenna for use with the Doppler radar speed sensor.

Figure 1:
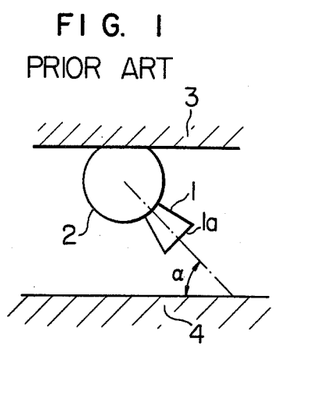
FIG. 1 is a diagram showing a mounting structure of a conventional Doppler radar speed sensor.
Figure 2:
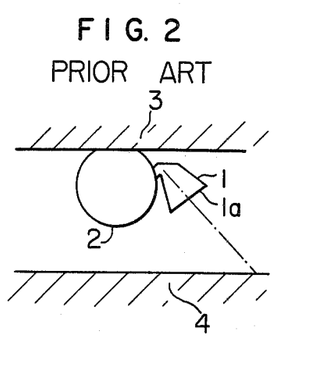
FIG. 2 is a diagram showing the condition in which the height of a conventional Doppler radar speed sensor is shortened.
Figure 8:
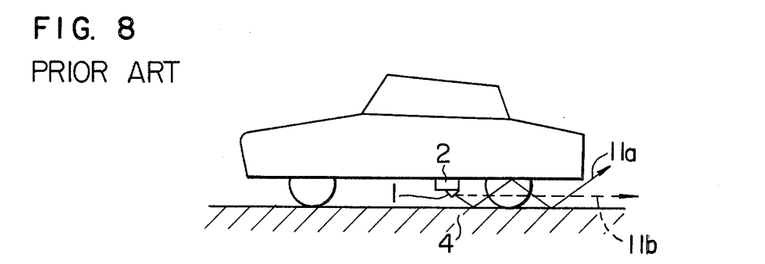
FIG. 8 shows the direction of microwave radiated from the Doppler radar mounted on the undercarriage of the vehicle in the prior art.

Conventional Doppler radar speed sensors for a control system of motor vehicles such as an electronic skid control (ESC) are mounted on the bumper or under the chassis of the automobile as shown in FIG. 1. Specifically, an antenna 1 is mounted on a Doppler radar or radar casing 2 fixed on the chassis 3 of the vehicle. The electromagnetic wave is radiated from the antenna 1 at an angle α with respect to a road surface 4. Refer, for example, to the Japanese Patent Publication No. 13752/78 issued May 12, 1978 owned by Fujitsu Limited et al. The disadvantages of this structure are that, firstly, if the undercarriage of the automobile come into contact with the surface 4 of a rough road, the Doppler radar 2 or antenna 1 may be damaged. Also, stones or mud which may directly attack the running automobile adversely affects the riding environment to a great degree. Secondly, if the Doppler radar speed sensor is mounted on the bumper, the electromagnetic wave from the antenna 1 is radiated directly into the atmosphere, thus interfering with the other Doppler radars. In order to reduce damage of the antenna 1 when the undercarriage touches the road surface, a measure has been suggested as shown in FIG. 2, in which the entire height of the Doppler radar is lowered by providing a corner at the antenna 1, thus reducing the height of the Doppler radar speed sensor as a whole. Nevertheless, the fact still remains that if the Doppler radar 2 comes into contact with the road surface, it may be damaged. Further, in the mounting structure of the Doppler radar on the lower side of the undercarriage shown in FIG. 1 or FIG. 2, some of the electromagnetic wave is undesirably radiated outside of the automobile through the space defined by the undercarriage and the road surface in the case where the radiation opening of the antenna is positioned on the undercarriage, even if the angle or the direction of radiation of the electromagnetic wave with respect to the road surface is selected in a manner to achieve the optimum Doppler effect as will be explained in detail later with reference to FIG. 8. The component of radiation outside of the vehicle will interfere with Doppler radars of the other vehicles. As seen from above, the mounting of the Doppler radar on the side or under the chassis of the vehicle without any countermeasures leads to the serious shortcomings of extremely deteriorating the environment of the Doppler radar on the one hand and causing the interference of electromagnetic waves on the other hand.

Generally, a parabolic antenna or a horn antenna is used for the Doppler radar of the vehicle. Especially for the radar for the vehicle speed sensor, a horn antenna is usually employed for the reason that the parabolic antenna is complicated in construction and requires a high machining accuracy so that the resulting high cost makes it unsuitable for practical applications.

A conventional horn antenna 1 is usually constructed as shown in FIG. 1. If this antenna 1 is mounted on the Doppler radar casing 2 which in turn is mounted on the undercarriage 3 together with the transmitter-receiver section as shown in FIG. 1 or FIG. 2, the horn antenna 1 always protrudes downward from the casing 2 and approaches the road surface 4, resulting in the disadvantage that the antenna 1 is likely to come into contact with the road surface 4 and be damaged. Further, in the case of the Doppler radar for the vehicle speed sensor, the electromagnetic wave beam $1a$ is required to be applied at the angle α to the road surface 4, and therefore it is necessary to mount the horn antenna 1 on the casing 2 at an angle, thus complicating the structure of the casing.

An ESC vehicle safety system incorporating such a Doppler radar speed sensor is disclosed in detail in the technical pamphlet of the present assignees issued Dec. 1977. This Doppler radar speed sensor is described in this pamphlet as one of the top 100 new products of the year 1977 under the sponsorship of the Industrial Research Magazine. This particular concept and application is also stated in the SAE/IEEE CONVERGENCE '78 entitled "Doppler Radar Speed Sensor for Anti-skid Control System" by Kohsaku Baba et al. of the present assignees.

The art of braking the vehicle by detecting the vehicle speed by means of the Doppler radar is also disclosed in the Japanese Patent Publications Nos. 38395/78 issued Oct. 14, 1978, 22232/78 issued July 7, 1978 and 22233/78 issued July 7, 1978 owned by one of the present assignees.

The microwave signal of the radar may be absorbed and attenuated by the adverse environment such as rainy weather, thus making impossible normal vehicle speed detection. A fail-safe vehicle speed signal processor useful in such an adverse condition is disclosed in the Japanese laid-open Patent Publication No. 50-6992 issued Jan. 24, 1975, owned by one of the present assignees.

An object of the present invention is to provide a mounting structure of a Doppler radar speed sensor which is high in resistance to environmental conditions and produces interference with no electromagnetic wave.

Another object of the present invention is to provide a structure of an antenna suitable for reducing the size of the Doppler radar for the vehicle speed sensor mounted on the lower side of the undercarriage of the vehicle.

The present invention is based on the findings that the rectangular undercarriage surrounded by the wheels of the vehicle provides a place where snow or mud is comparatively unlikely to attach, that an experiment has confirmed that the Doppler radar is prevented from being damaged if mounted in a recess formed in the undercarriage, and that this method provides a means for solving the above-mentioned problem of adverse environment.

In the case of using a microwave circuit antenna such as a horn antenna in which the electromagnetic wave beam coincides with the axial direction of the antenna, the antenna-mounting plane forms an angle to the road surface. This not only complicates the casing construction but also fails to reduce the size of the Doppler radar device. According to an aspect of the present invention to obviate such a problem, a slot array antenna in which the direction of the electromagnetic wave beam is capable of being set as desired is simply provided on the bottom of the metal casing of the device so that each antenna slot is in parallel to the undercarriage plane, thus realizing a simple and thin casing structure capable of producing an electromagnetic wave beam radiated at an angle to the road surface.

The above and other objects, features and advantages of the invention will be apparent from the following detailed description taken in conjunction with the accompanying drawings, in which.

Embodiments of the present invention will be described below with reference to the accompanying drawings.

The embodiments of FIGS. 3 to 7 use a Doppler radar speed sensor module of the type described in the technical pamphlet of the present assignees mentioned above only for illustrative purposes. The Doppler radar device 2 includes a 5 mW-rating transmitting power, high-sensitive 24 GHz Doppler radar having a Gunn diode as a microwave generator. The antenna 1 is a horn antenna made of Teflon (tradename) sheet with the opening thereof water-proofed and has an antenna gain of 18 dB. Of course, the antenna may be a slot array antenna as described later. The radar device 2 and the antenna 1 are housed in a water-proof aluminum diecast casing and makes up a Doppler radar speed sensor. The opening of the horn antenna 1 is configured to form an angle of 45 degrees to one side of the casing facing the road surface when mounted on the vehicle. The casing including the antenna has dimensions of about 140 mm long by 94 mm wide by 70 mm high.

Figure 3:
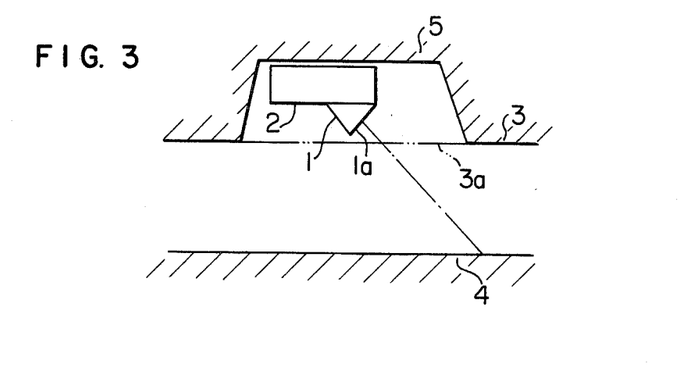
FIG. 3 is a diagram showing a Doppler radar speed sensor mounted in an undercarriage recess formed according to the present invention.

A mounting position of the Doppler radar of the vehicle is shown in FIG. 3 for explaining the basic concept of the present invention.

As shown in FIG. 3, the Doppler radar speed sensor comprising the Doppler radar 2 and the antenna 1 is mounted in a recess 5 formed at a desired area of the rectangular undercarriage surrounded by automobile wheels, in such a manner that the whole structure of the Doppler radar speed sensor is recessed from the plane 3a aligned with the undercarriage bottom plane and that the antenna opening is positioned usually in the direction reverse to the running direction of the vehicle. In the case of additionally using another radar device, the antenna opening may be positioned at a different direction. The sensor, or in particular the apex of the antenna opening is located at a higher level than the plane 3a. As an alternative to the recess 5 for wholly housing the Doppler radar speed sensor, a preformed recess, if any, in the automobile undercarriage such as under the rear seat of the passsenger car may be used with equal effect.

Figure 4:
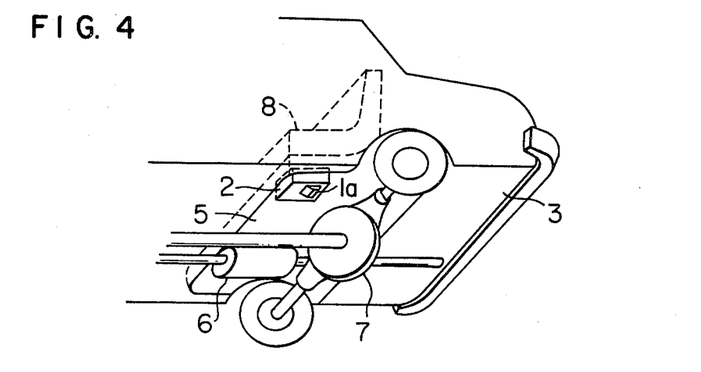
FIG. 4 shows an embodiment in which the Doppler radar as actually mounted in the lower side of the vehicle undercarriage.
Figure 5:
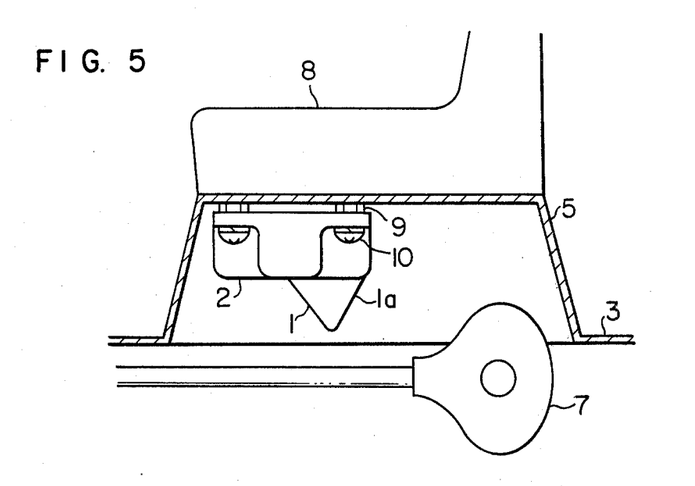
FIG. 5 is a diagram showing a mounting structure of the Doppler radar in an existing recess.
Figure 6:
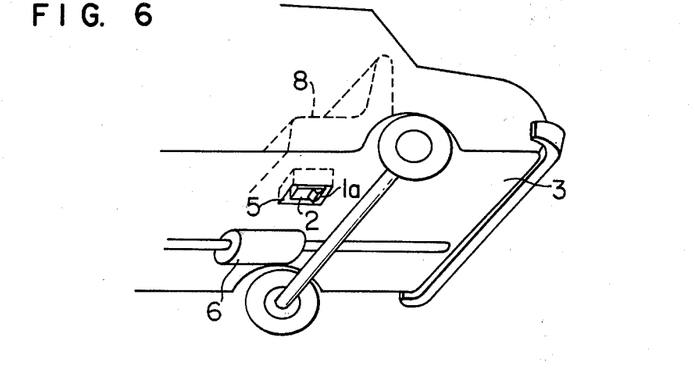
FIG. 6 shows an embodiment in which the Doppler radar is mounted in an exclusive recess formed in the vehicle undercarriage.

A specific example of the application of this embodiment to an automobile is shown in FIGS. 4 and 5 represents the case of a rear-drive four-wheel automobile. The type of automobile generally has a recess 5 for accomodating a differential gear 7 for rear-drive of the vehicle which recess generally measures 8 cm to 10 cm in depth. This recess is comparatively less subjected to exposure to snow or water splash and therefore provides the best portion for mounting the radar device in the vehicle undercarriage 3. Further, since the radar wave source, particularly, the opening of the antenna thereof is situated at a position recessed from the generally flat lower surface of the undercarriage (plane 3a), interference with external devices is reduced. Furthermore, it is less likely that the microwave generated causes secondary radiation by being struck against the wheels. A satisfactory result is obtained by designing a Doppler radar speed sensor about 7 cm thick by 4 cm wide by 10 cm long in such a manner that the antenna opening is set in the opposite direction to the vehicle running direction in the recess while at the same time, appropriately setting the distance between the antenna opening end and the inner wall of the recess opposed thereto. Some of the front-drive automobiles lack the recess 5, in which case an exclusive recess 5 is required to be formed in the underside of the vehicle undercarriage 3. Such an example is shown by FIG. 6 in which the recess 5 having dimensions by 8 cm in depth by 15 cm in width by 10 cm in length mounted with the Doppler radar 2 therein is formed in the vehicle undercarriage 3 at a position directly under the rear seat or front seat where neither the functions nor the residential quality of the automobile is affected.

An example of the mounting structure of the Doppler radar 2 is shown in FIG. 5. The Doppler radar 2 is secured by mounting screws 10 to nuts 9 fixed to the undercarriage 3 in advance by welding. As an alternative to this measure, the Doppler radar 2 may be secured from inside the chassis by the mounting bolts passed through holes preformed in the undercarriage.

Next, the operation of the embodiments thus configured will be explained.

Figure 7:
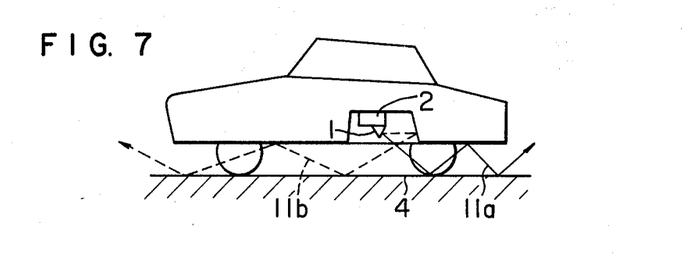
FIG. 7 is a diagram showing the direction of the microwave radiated by the Doppler radar mounted in the recess.

By mounting the Doppler radar speed sensor in this way, it is obviously prevented from being damaged by being brought into contact with the road surface 4 even if the lower surface of the undercarriage 3 of the automobile comes into contact with the road surface 4 for some reason. The configuration in which the antenna opening is arranged in the direction opposite to the vehicle running direction reduces the chance of stones or mud directly striking the Doppler radar speed sensor, or particularly, the antenna opening. Further, in view of the fact that as shown in FIG. 7 the Doppler radar speed sensor is mounted completely within the recess 5 of the vehicle undercarriage 3, the unrequired microwave beam which otherwise might be transmitted in a direction 11a is scattered or attenuated by the wall of the recess 5 as shown by a dotted line 11b, with the result that the microwave beam is not radiated directly out of the area under the chassis thus reducing electromagnetic interference to the external. If desired, a member for absorbing the microwave may be mounted at a position opposite to the antenna opening on the wall of the recess.

It will be understood from the foregoing description that according to the present invention the interference to external devices as well as the damage caused by the contact with the road surface and the contamination by stones or mud is greatly reduced by a simple method.

Figure 9:
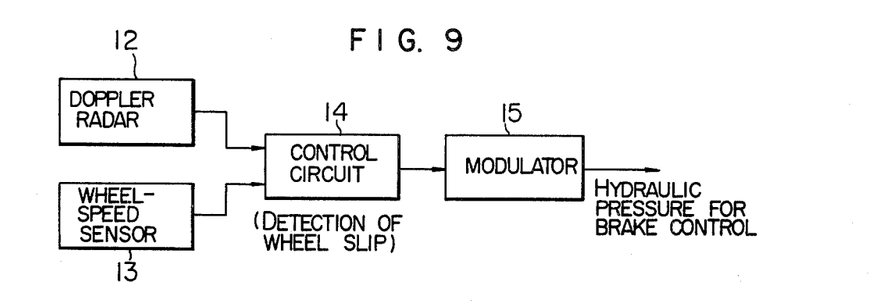
FIG. 9 is a block circuit diagram showing an electronic skid control (ESC) system to which a Doppler radar speed sensor according to the present invention is applied.

An ESC system to which the Doppler radar vehicle speed sensor according to the present invention is applied is schematically shown in the block diagram of FIG. 9. The ESC system basically comprises a vehicle-speed sensor 12 using a Doppler radar according to this invention, a wheel-speed sensor 13, a control circuit 14 and vacuum actuated modulator 15 for controlling the hydraulic pressure for vehicle brakes. The control circuit 14 has a slip detector and a solenoid driver. The slip detector is a simple logic circuit incorporating one counter. The slip detector determines a wheel slip from the ratio between the wheel speed and the vehicle speed and produces a command signal to release the brake pressure through a modulator solenoid 15' (FIG. 10).

Figure 10:
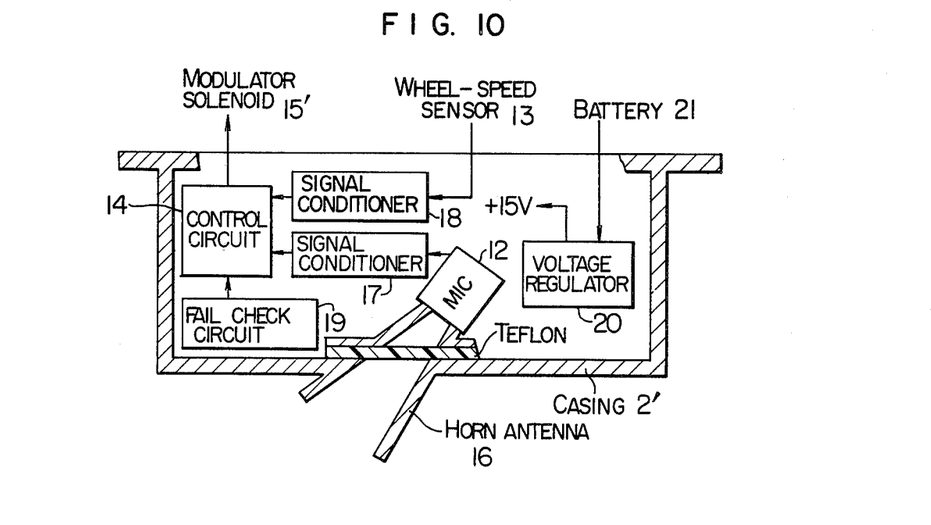
FIG. 10 is a block diagram showing a module of the control circuit and the Doppler radar in the system of FIG. 9.

FIG. 10 shows a block diagram of an electronic ESC module accommodated in the casing for the present Doppler radar system. A casing 2' of the module may accommodate a microwave IC 12, a horn antenna 16, a vehicle-speed signal conditioner 17, a wheel-speed signal conditioner 18, the control circuit 14, a fail check circuit 19 and a voltage regulator 20 connected to an external battery 21 of the vehicle for example. The horn antenna 16 radiates a vertically polarized beam incident at 45 degrees on the road surface in operation.

The embodiments shown in FIGS. 11 to 19 disclose a structure of the Doppler radar antenna by which the thickness i.e., the height of the Doppler radar module or Doppler radar speed sensor mounted on the undercarriage of the vehicle is reduced, thus realizing a compact Doppler radar antenna having an improved mountability. Basically, this structure comprises a combination of a slot array antenna and a Doppler radar module in place of the horn antenna taking advantage of the fact that the slot array antenna is generally flat in form and the direction of the microwave beam thereof may be set as desired without slanting and protruding the antenna opening from the surface of the casing.

Figure 11:
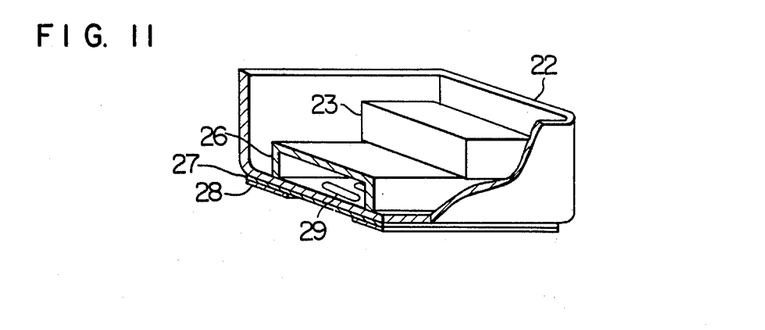
FIG. 11 is a partially cutaway perspective view of a slot array antenna according to the present invention.
Figure 12:
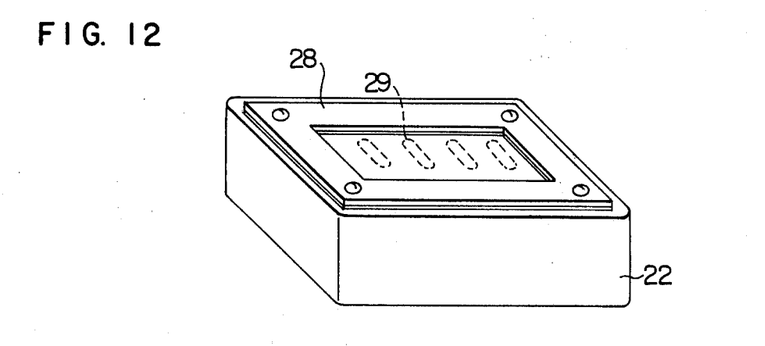
FIG. 12 is a bottom view thereof.

As shown in FIGS. 11 and 12, the slot array antenna comprises a metal casing 22 and a waveguide 26 integrated with each other and an array of slots 29 are formed in the metal casing 22. This is also called a slotted waveguide antenna. A water-proof sheet 27 of a dielectric material such as Teflon for covering the slots 29 is mounted by the sheet fixing plate 28. This casing 22 corresponds to the casing 2' of FIG. 10 and includes a microwave transmission/receiving unit 23 and other signal-processing circuits.

Figure 13:
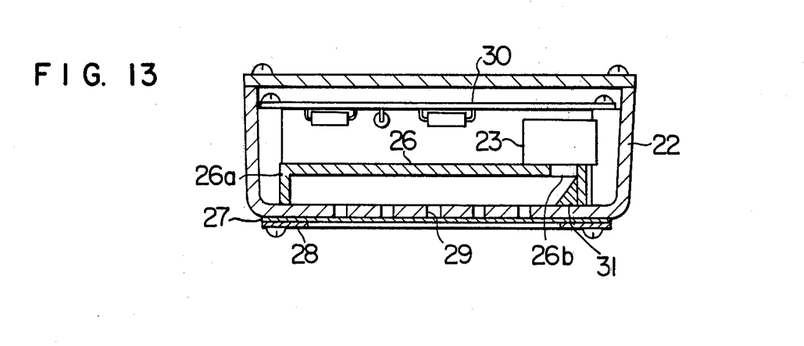
FIG. 13 is a sectional view of an embodiment of the slot array antenna according to the present invention.

A sectional view of a specific example of this construction is shown in FIG. 13. The waveguide 26 is mounted in such a manner to have on one side thereof the slots 29 formed in the metal casing 22. The waveguide 26 has at an end thereof a corner guide 31. The transmission/receiving unit 23 is mounted in a window, i.e., a waveguide opening 26b, while the other end 26a of the waveguide provides a short-circuiting surface or a resistive termination. The slots 29 are covered by the water-proof sheet 27, and the casing 22 contains a printed-circuit board 30 carrying the signal processing circuits as shown in FIG. 10.

Figure 14:
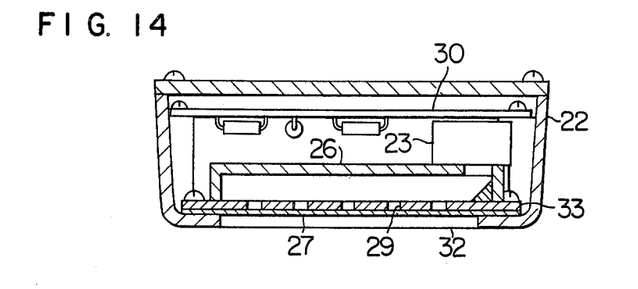
FIG. 14 is a sectional view showing a modification of the present invention.

Another embodiment of the present invention is shown in FIG. 14. The flat antenna plate 33 formed with an array of slots 29 providing part of the waveguide 26 is mounted on the metal casing 22 through the water-proof sheet 27. The metal casing 22 has a window, namely, the casing antenna opening 32 to expose the slots 29 to the external environment.

Figure 15:
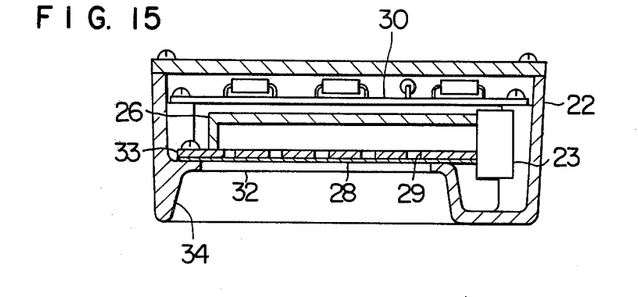
FIG. 15 is a sectional view showing a modification of the present invention.
Figure 16:
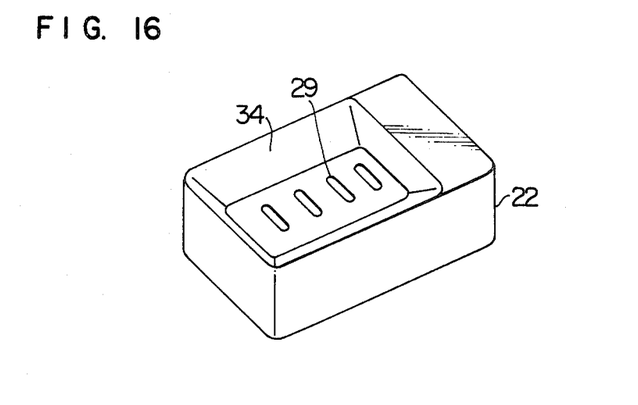
FIG. 16 is a perspective view showing the modification of FIG. 15.

Still another embodiment of the present invention is shown in FIG. 15, in which the antenna opening 32 of the metal casing 22 shown in FIG. 14 is formed in the bottom of a horn-shaped recess of the metal casing 22. FIG. 16 is a perspective view of FIG. 15.

Next, the operation of the slot array antenna according to the embodiment configured as above will be explained.

Figure 17:
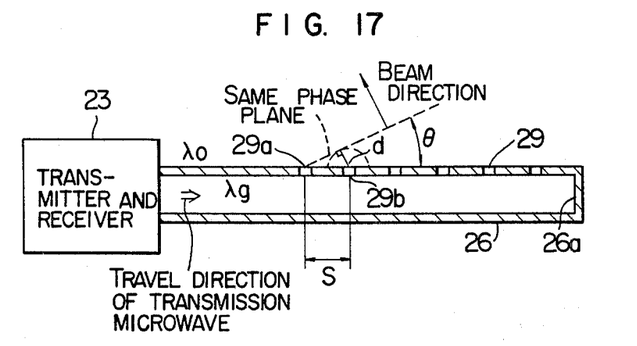
FIG. 17 is a diagram for explaining the operating principle of the slot array antenna.

First, explanation will be made of the slot array antenna with reference to FIG. 17. The electromagnetic wave such as microwave travelling along the axis of the waveguide 26 from the wave transmission/receiving section 23 is radiated successively by way of the slots 29 formed in the waveguide. By relating the distance or interval S between the slots 29 to the velocity of the microwave travelling through the waveguide, the direction of the microwave beam may be set as desired. Also, with the increase in the number of the slots 29, the beam may be sharpened, i.e., the antenna gain is improved. Let the intervals of slots 29 be S, the wavelength in the waveguide be $\lambda_g$, the deflection angle of the beam be $\theta$, and the wavelength in space be $\lambda_o$. In order to attain the deflection angle $\theta$ of the beam, it is sufficient to establish the angle $\theta$ between the phase plane and the waveguide. In expressing this relation in an equation, the phase of the electromagnetic wave that has passed the slot intervals S and the space distance d is made equal to that of the electromagnetic wave at the slot 29a. Thus, $$2\pi S/\lambda_g + 2\pi d/\lambda_o = 2\pi$$

Since d = S sin $\theta$, the above equation is rewritten into $$1/\lambda_g + \sin\theta/\lambda_o = 1/S$$

As a result, the relation mentioned below is attained.

$$\theta = \sin^{-1}\{\lambda_o(1/S - 1/\lambda_g)\}$$

Figure 19:
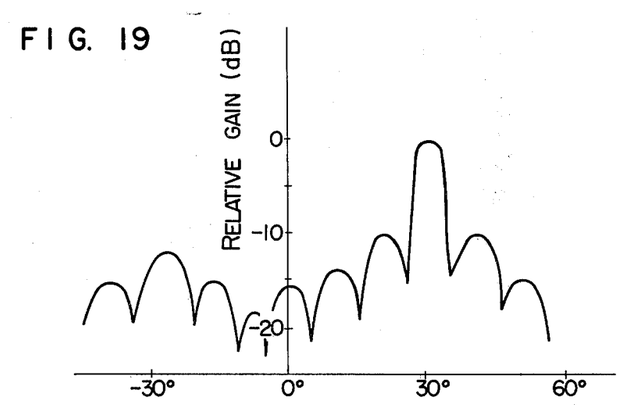
FIG. 19 shows an example of the characteristics of the slot array antenna according to the present invention.

It is noted from this equation that by changing the interval S between the slots 29, the direction of the beam may be set as desired. Another calculation shows that the half-power beam width φ is approximately $$\phi = 101.8°/N$$

where N is the number of slots. Thus, the antenna gain is also capable of being set by the number of slots. In this embodiment, the microwave frequency is about 24 GHz, the slot number is seven and the slot interval is about 1 cm. Then, the radiation angle α is about 60° and the spread angle of the radiated wave is ±7°. A relative gain pattern of the antenna according to an embodiment of this invention is shown in FIG. 19. Further, by changing the longitudinal direction of the slot 29 with respect to the axis of the waveguide 26, the E-plane or H-plane may be used as the polarization plane of the radar microwave. The foregoing description concerns a transmitting antenna, but it is proved from the antenna theory that similar characteristics are exhibited by a receiving antenna. The embodiments of FIGS. 13 and 14 have the group of slots 29 formed in one side of the metal casing 22 and exhibit similar characteristics. In FIG. 15, the slot array antenna provides a radiation source surrounded by a horn antenna, in which the gain of the slot antenna is added to that of the horn antenna, resulting in a higher antenna gain. Also, since the slot array antenna is located in the recess, the surfaces of the antenna are prevented from being contaminated.

Figure 18:
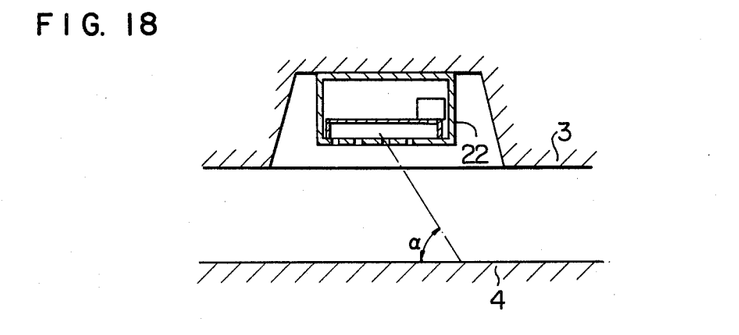
FIG. 18 is a diagram showing the mounting condition of the slot array antenna according to the present invention.

As understood from the foregoing description, the slot array antenna is formed directly on the metal casing 22 of the Doppler radar according to the present invention. Therefore, in the application of the present invention to the Doppler radar mounted on the vehicle undercarriage, the thickness, i.e., height of the device may be reduced as shown in FIG. 18. This prevents the antenna from approaching the road surface, thus improving the mountability on the vehicle. Further, the device according to the present invention is compact as compared with the conventional devices in which a horn antenna is mounted on the Doppler radar. Furthermore, since the components of the waveguide are formed integrally, it may be made by use of a diecast or the like. Moreover, the antenna characteristics are changed only by the intervals or number of the slots. This simplifies adaptation to many models, leading to great advantage of low cost.

What is claimed is:

1. In a motor vehicle having a substantially-flat undercarriage, a rear wheel axle having a differential housing and Doppler radar speed sensor including an antenna section and a sensor section mounted on the underside of the undercarriage of the vehicle for detecting the speed thereof, a mounting structure for said Doppler radar speed sensor comprising,
a chamber formed in said substantially-flat undercarriage of the vehicle, said chamber being recessed upward from the bottom level of said undercarriage and open downward for housing the whole of said Doppler radar speed sensor means, said recessed chamber being located in the vicinity of said differential housing and slightly in front of said rear wheel axle, and
means for mounting said Doppler radar speed sensor means in said chamber of said vehicle undercarriage in such a manner that the opening end surface of said antenna section is directed rearwardly of the vehicle with a downward inclination toward the road surface and is positioned higher than the bottom level of said flat undercarriage of the vehicle.

2. A mounting structure of the Doppler radar speed sensor according to claim 1, wherein said vehicle includes a muffler disposed below the undercarriage thereof and wherein said antenna section is arranged on the side opposite to the muffler of the vehicle with respect to the longitudinal axis of the vehicle.

3. A mounting structure of the Doppler radar speed sensor according to claim 1, wherein said chamber is a recess formed directly under a seat of the vehicle, and the opening of said antenna is arranged within said recess in a manner to radiate a radar wave at an angle with respect to a longitudinal axis of the vehicle.

4. A mounting structure according to claim 1, 2 or 3, wherein said Doppler radar speed sensor means comprises a casing for accommodating at least a microwave generator, a microwave transmitter/receiver and a microwave antenna, said mounting means being coupled to said casing.

5. A mounting structure according to claim 1, 2 or 3 wherein said antenna section is a horn antenna and is formed integrally with a casing for containing said sensor section, said horn antenna being mounted on said casing in such a manner that the opening plane of said horn antenna is at an angle of 45 degrees with respect to the axis of the vehicle.

6. A mounting structure according to claim 1, 2 or 3, wherein said sensor includes at least a microwave generator and a microwave transmission/receiving circuit, said sensor being housed in a metal casing, said antenna section being coupled to said transmission/receiving circuit section, said antenna being a slot array antenna having a slot array formed in a side of the waveguide, which side is substantially parallel to the undercarriage of the vehicle.

7. A mounting structure according to claim 6, wherein said metal casing is part of said waveguide and has an integrated side formed with said slot array.

8. A mounting structure according to claim 6, wherein said metal casing has an opening for exposing said slot array antenna and carries said antenna.

9. A mounting structure according to claim 6, wherein said casing has a horn-shaped recess in one side thereof, and said slot array is positioned in the bottom of said horn-shaped recess.

10. A mounting structure according to claim 6, wherein a water-proof member of a dielectric material is provided on said waveguide in a manner to cover said slot array.

11. A mounting structure of the Doppler radar speed sensor according to claim 1, wherein said vehicle includes a muffler, and wherein said chamber accommodates said differential housing, the antenna section of said Doppler radar speed sensor including a member providing a slot array and a waveguide coupled with said member to form a slot array antenna and the slot array of said antenna being arranged on the front wheel side of said chamber and on the side of the longitudinal axis of the vehicle opposite to the muffler of the vehicle in a manner to radiate a radar wave at an angle with respect to the flat undercarriage of the vehicle.

* * * * *